Patented Aug. 19, 1930

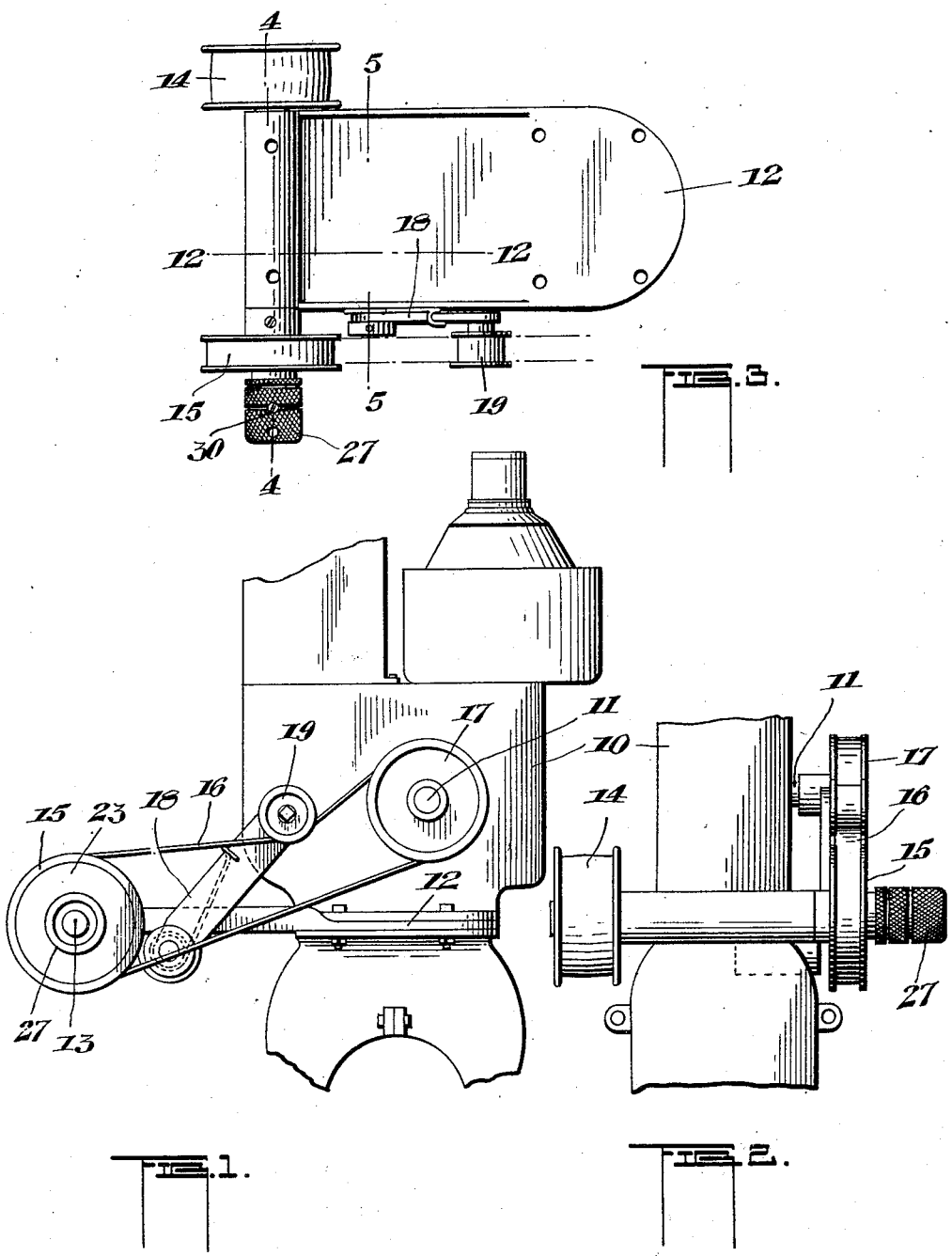

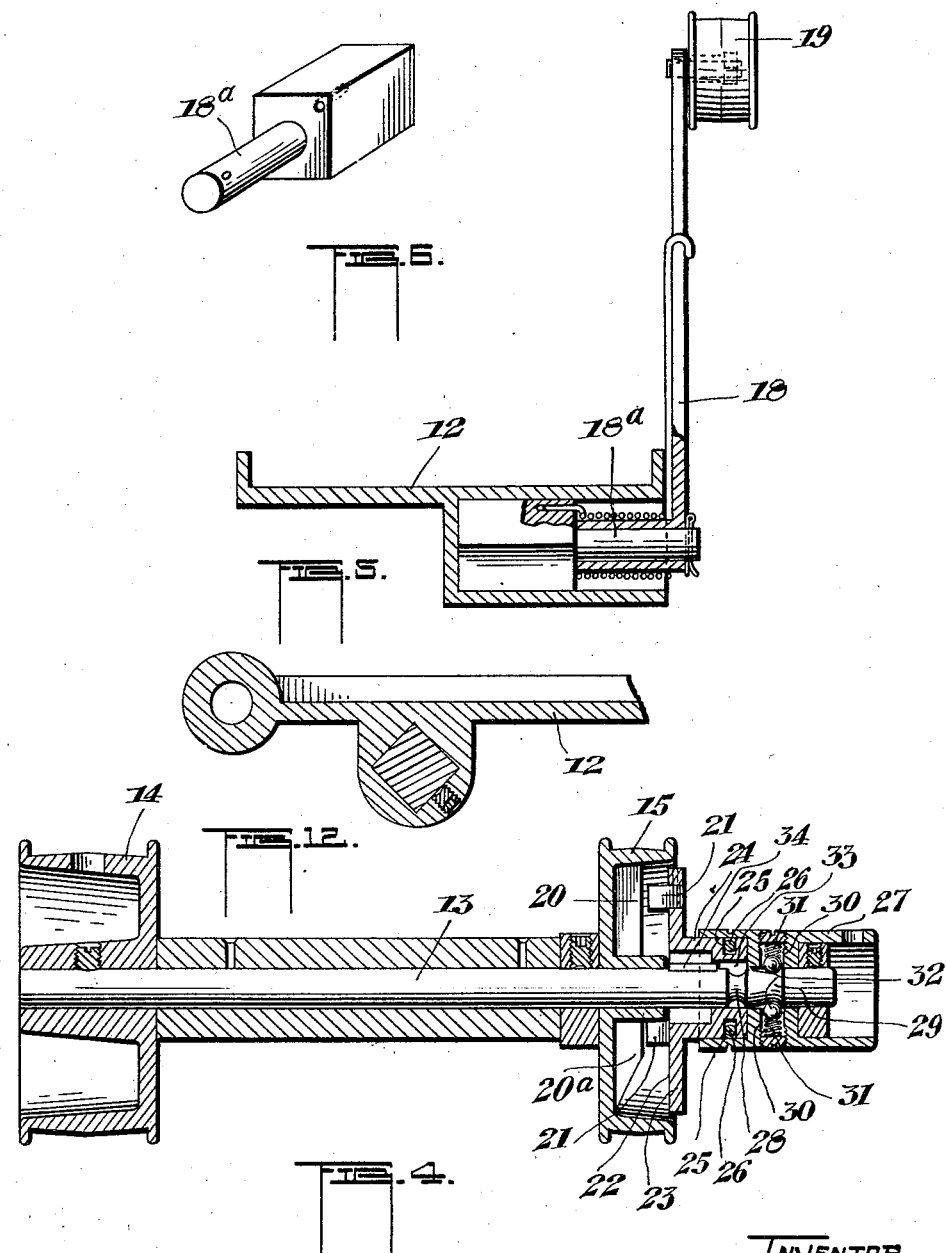

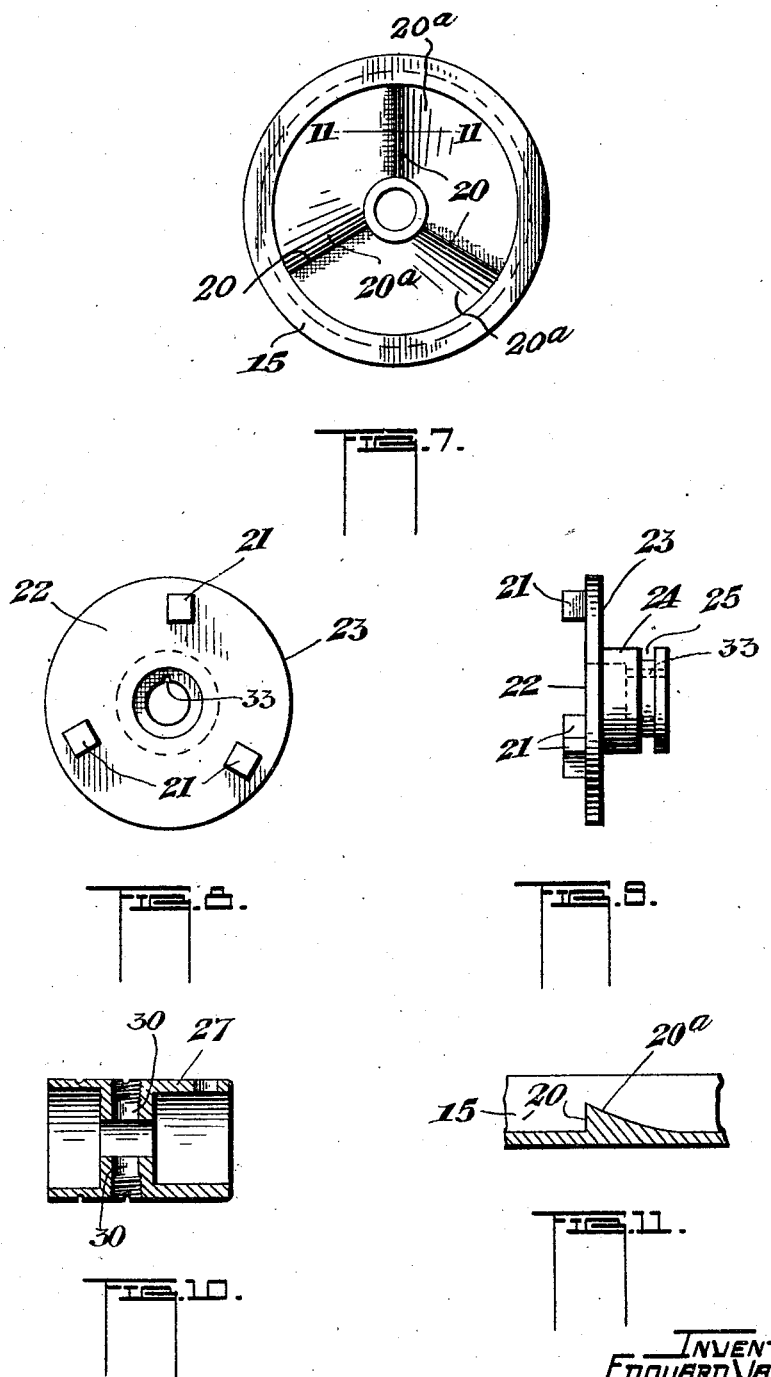

1,773,607

UNITED STATES PATENT OFFICE

EDOUARD VANDECAN, OF RENFREW, ONTARIO, CANADA, ASSIGNOR TO RENFREW MACHINERY COMPANY LIMITED, OF RENFREW, ONTARIO, CANADA

DRIVE MECHANISM

Application filed November 9, 1927. Serial No. 232,145.

This invention relates to improvements in drive mechanisms and more particularly to drive mechanisms for cream separators and the like and the objects of the invention are to provide improved mechanism of this description of simple economical and durable construction whereby more even running of the separator bowl is provided and whereby on any check occurring the mechanism is automatically thrown out of gear.

Further objects are to provide improved means of this character whereby the transmission of power is more uniform and regular, free from shock or jerky motion.

In cream separators at present in use a belt is used with a tight and loose pulley provided with a belt shifter and thence from the countershaft which is part of the drive by an endless belt to the lower or worm wheel shaft of the separator. With my improved mechanism the belt shifter is eliminated and a clutch is provided for the countershaft adapted to be automatically operated on any check occurring and to be manually returned to operating position.

In other words the counter drive shaft is automatically thrown out of gear on any check occurring or other unforeseen instance happening in the operation of the machine to remain in this position until the clutch is manually operated to throw the drive mechanism into gear.

The novel features of my invention therefore include an improved clutch for the drive shaft normally adapted to retain the mechanism in gear and automatically operable to throw the mechanism out of gear.

Referring now to the drawings in which like characters of reference indicate corresponding parts in each figure, Figure 1 is a fragmentary side elevation of a cream separator with my improved drive mechanism.

Figure 2 is a front elevation of the same.

Figure 3 is a top plan view of my device detached from the separator.

Figure 4 is an enlarged section on the line 4—4 of Figure 3 with the disc in disengaged position.

Figure 5 is an enlarged section on the line 5—5 of Figure 3.

Figure 6 is a perspective view of the belt tightener support.

Figure 7 is a side elevation of the pulley.

Figure 8 is a front elevation of the clutch member.

Figure 9 is a side elevation of the same.

Figure 10 is a longitudinal section through the sleeve member.

Figure 11 is an enlarged section on the line 11—11 of Figure 7.

Figure 12 is an enlarged section on the line 12—12 of Figure 3.

Referring now more particularly to the drawings in which a preferred example of my invention is disclosed, 10 designates the body of a cream separator within which is the worm wheel drive shaft 11 for the bowl operating spindle (not shown). Associated with this body portion is a supporting plate 12 adapted to be secured thereto in any well known manner and designed to carry my improved countershaft drive mechanism comprising the countershaft 13 suitably journalled therein and provided at its protruding end with a pulley 14 designed to be connected in any suitable manner, preferably by a belt, to a prime mover or any other source of power, the prime mover being conveniently supported on the plate 12.

On the other end of the shaft 13 is loosely mounted a hollow pulley 15 connected by a belt 16 to the pulley 17 on the main drive shaft 11. Intermediate of the pulleys 15 and 17 I provide a coil spring belt tightener 18 on a supporting spindle $18^a$ having a pulley 19 under which the belt 16 runs to automatically absorb all shock resulting from any cause whatever and also any irregularities of speed which may occur (see Figure 5).

For throwing the pulley 15 and with it the counter drive shaft 13 into gear and automatically throwing these members out of gear when a check or other irregularity occurs, I provide on the interior of the pulley a plurality of circumferentially spaced teeth 20 formed with sloping or concave surfaces $20^a$ (see Figures 7 and 11). These teeth are designed for driving engagement with spaced teeth or blocks 21 (see Fig. 8) on the inner face 22 of a clutch member 23 slidably mounted on the shaft 13 and adapted to engage and disengage the teeth or blocks 21 with the teeth 20 of the pulley 15. Simultaneously on inwardly engaging movement of the clutch member 23, the slot 33 formed therein engages with a feather 34 formed integral with the shaft 13 to throw it into gear with the clutch member and consequently with the pulley 15. The slot 33 in the clutch member is formed in a collar portion thereof 24 and a peripheral groove 25 is also formed in the collar (see Fig. 9). This groove is designed to engage with pins 26 formed interiorally of the sleeve 27, hereinafter more fully referred to.

The shaft 13 is formed with a circular groove 28 substantially registering with the collar 24 of the clutch member 23 and contiguous thereto is a second groove 29 of larger proportions while the sleeve 27 is provided with openings 30 in which are coil springs 31 associated with balls 32 adapted to engage respectively with the grooves 28 and 29 thereby providing spring actuated balls for the clutch member 23 adapted to retain the clutch in engaged or disengaged position respectively, and manually operable to be moved inwardly to throw the mechanism into gear.

The foregoing construction is more particularly illustrated in Figure 4 in which the clutch member 23 is shown in inoperative position. When operated by being moved inwardly to an operable position throwing the pulley 15 into gear, the clutch member is manually moved inwardly with the sleeve 27 until the blocks or teeth 21 contact with or firmly abut the straight surfaces 20 of the teeth on the pulley 15, the spring actuated balls being at the same time moved from engagement with the groove 29 in the shaft 13 to the adjoining groove 28. On the slightest shock occurring in operation the teeth 21 will automatically slide off the surfaces 20 until they reach the position shown in Figure 4 and at the same time the spring actuated balls 32 will be moved out of engagement with the groove 28 thereby retaining the clutch member 23 in disengaged position and the drive mechanism out of gear until the sleeve connected clutch member is again manually moved inwardly to operable position.

The sleeve 27 on the outside, as shown in Figure 2, is milled to afford a gripping surface, and through the engagement of the pins 26 with the groove 25 in the collar 24, said collar and clutch member move with the sleeve 27.

In operation on the mechanism being started, the sleeve 27 is manually operated inwardly on the shaft 13 thus moving the clutch member with it and engaging the teeth or blocks 21 with the teeth 20 of the pulley 15. At the same time the slot 33 in the collar 24 moves into engagement with the feather 34 on the shaft 13 so that the pulley 15 is locked in driving engagement with the shaft 13 and will drive the pulley 17 through the connecting belt 16. When the sleeve 27 has been pushed inwardly to lock the parts in driving engagement, the balls 32 will lie in engagement with the groove 28. When any resistance takes place through a check or otherwise, the teeth 21 on the clutch member 23 will be moved outwardly through contact with the concave surfaces 20$^a$ of the teeth 20 so that the clutch member will be moved from engagement with the shaft and the sleeve 27 through its connection with the collar 24 by way of the pins 26 and groove 25 will be moved outwardly with the clutch so that the balls 32 will be removed from engagement with the groove 28 in the shaft 13 and retained in the groove 29 of the shaft 13, holding the clutch out of engagement and in inoperative position.

In order to clearly illustrate the nature of the overload or irregularity, it will be realized that the bowl of the separator under normal operating conditions, will rotate at high speed, and if for any reasons, the driving motor fails, the shaft 13 will very soon stop. However the bowl will keep rotating for some considerable time due to the speed at which it is travelling, as will also the shaft 11 and pulley 17.

Instead of a sharp check occurring in the rotation of the bowl through the influence of the belt 16, between the pulley 15 and the pulley 17, the blocks 21 will immediately contact with the sloping surface 20$^a$ of the teeth on the interior of the pulley 15, due to the fact that the loosely mounted pulley 15 will continue to rotate under the influence of the belt 16, so that the clutch member 23 is immediately disengaged from driving contact with the pulley 15, and the separating bowl and moving parts will gradually come to rest without any jarring or injuring influence.

As many changes could be made in the above construction and many apparently widely different embodiments of my invention, within the scope of the claim, constructed without departing from the spirit or scope thereof, it is intended that all matter contained in the accompanying specification and drawings shall be interpreted as illustrative and not in a limiting sense.

What I claim as my invention is:—

In drive mechanism of the character described, the combination of a clutch including a drive shaft with peripheral grooves therein, a hollow pulley loosely mounted on the shaft and provided on the inner wall thereof with a plurality of circumferentially spaced teeth formed with sloping concave surfaces, a clutch member slidable on the shaft and formed with a plurality of teeth adapted to abut the pulley teeth in normal driving engagement and to slidably bear on the concave surfaces under abnormal conditions, a sleeve connected to the clutch member and slidable axially therewith encasing one end of the drive shaft and the grooves therein, spring pressed means carried by the sleeve for engagement with the shaft grooves to lock the clutch member in engaged or disengaged position, and means for locking the shaft in driving connection with the clutch member simultaneously with the engagement of the clutch member with said pulley.

In witness whereof I have hereunto set my hand.

EDOUARD VANDECAN.